US008050208B2

(12) United States Patent
Jung et al.

(10) Patent No.: US 8,050,208 B2
(45) Date of Patent: Nov. 1, 2011

(54) METHOD FOR ADAPTIVE DISCONTINUOUS RECEPTION BASED ON EXTENTED PAGING INDICATOR FOR IMPROVEMENT OF POWER EFFECTIVE PERFORMANCE AT MOBILE TERMINAL ON WCDMA

(75) Inventors: Soo-Jung Jung, Daejeon (KR); Byung-Han Ryu, Daejeon (KR); Yoan Shin, Seoul (KR); Myung-Sik Yoo, Seoul (KR); Suck-Chel Yang, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 716 days.

(21) Appl. No.: 12/086,259

(22) PCT Filed: Aug. 31, 2006

(86) PCT No.: PCT/KR2006/003443
§ 371 (c)(1),
(2), (4) Date: Jun. 9, 2008

(87) PCT Pub. No.: WO2007/066875
PCT Pub. Date: Jun. 14, 2007

(65) Prior Publication Data
US 2009/0040955 A1    Feb. 12, 2009

(30) Foreign Application Priority Data
Dec. 10, 2005  (KR) .................. 10-2005-0121333

(51) Int. Cl.
G08C 17/00 (2006.01)
H04M 1/00 (2006.01)
(52) U.S. Cl. ....................... 370/311; 455/574
(58) Field of Classification Search .............. 370/311, 370/342; 455/572, 573, 574
See application file for complete search history.

(56) References Cited

U.S. PATENT DOCUMENTS
4,736,369 A * 4/1988 Barzilai et al. ............... 370/231
(Continued)

FOREIGN PATENT DOCUMENTS
EP     1 357 765 A2   10/2003
(Continued)

OTHER PUBLICATIONS

International Search Report and Written Opinion mailed Mar. 13, 2009 in corresponding International Patent Application PCT/KR2006/003443.

Primary Examiner — George Eng
Assistant Examiner — Christopher M Brandt
(74) Attorney, Agent, or Firm — Staas & Halsey LLP

(57) ABSTRACT

An extended paging indicator-based adaptive discontinuous reception method is proposed so as to improve a power saving performance of a terminal in an asynchronous wideband code division multiple access schemes. To this end, a plurality of terminals for performing power saving receive an extended paging indicator for a discontinuous reception cycle, conform a type of a bit Run for configuring the extended paging indicator, and change the discontinuous reception period. In addition, the terminals set the discontinuous reception period update factor value to be varied according to the extended paging indicator as an initial value so as to determine a next paging occasion block, change the discontinuous reception period update factor value according to the paging indicator of the bit Run received from base station, and change the discontinuous reception period according to the variance of the discontinuous reception period update factor value. The extended paging indicator-based adaptive discontinuous reception method may improve transmission time delay and transmission failure probability performances for packet reception as well as a power saving performance in comparison with a conventional fixed discontinuous reception method.

11 Claims, 8 Drawing Sheets

U.S. PATENT DOCUMENTS

| | | | |
|---|---|---|---|
| 5,373,506 A * | 12/1994 | Tayloe et al. | 370/311 |
| 6,324,397 B1 | 11/2001 | Adachi et al. | |
| 2002/0006805 A1 * | 1/2002 | New et al. | 455/525 |
| 2003/0185162 A1 * | 10/2003 | Fraser et al. | 370/311 |
| 2004/0116110 A1 * | 6/2004 | Amerga et al. | 455/422.1 |
| 2004/0176147 A1 * | 9/2004 | Escalante | 455/574 |
| 2005/0101351 A1 * | 5/2005 | Lee et al. | 455/558 |
| 2005/0153715 A1 * | 7/2005 | Hwang et al. | 455/458 |
| 2005/0153751 A1 * | 7/2005 | Bultan et al. | 455/574 |
| 2005/0195852 A1 * | 9/2005 | Vayanos et al. | 370/437 |
| 2005/0233732 A1 * | 10/2005 | Kwak et al. | 455/414.1 |
| 2005/0288040 A1 * | 12/2005 | Charpentier et al. | 455/458 |
| 2007/0082606 A1 * | 4/2007 | Eckert et al. | 455/3.06 |
| 2007/0109987 A1 * | 5/2007 | Kohlmann et al. | 370/318 |
| 2007/0133479 A1 * | 6/2007 | Montojo et al. | 370/335 |
| 2008/0220796 A1 * | 9/2008 | Kohlmann et al. | 455/458 |

FOREIGN PATENT DOCUMENTS

| | | |
|---|---|---|
| EP | 1 499 141 A2 | 1/2005 |
| JP | 09-261153 | 10/1997 |
| KR | 10-2002-0014108 | 2/2002 |
| WO | 2005/067182 A1 | 7/2005 |

* cited by examiner

METHOD FOR ADAPTIVE DISCONTINUOUS RECEPTION BASED ON EXTENTED PAGING INDICATOR FOR IMPROVEMENT OF POWER EFFECTIVE PERFORMANCE AT MOBILE TERMINAL ON WCDMA

CROSS REFERENCE TO RELATED APPLICATION

This application is based on and claims priority to International Application PCT/KR2006/003443 filed on Aug. 31, 2006, and Korean Application No. 10-2005-0121333 filed on Dec. 10, 2005, the disclosures of which are hereby incorporated herein by reference.

BACKGROUND OF THE INVENTION (a) Field of the Invention

The present invention relates to an extended paging indicator-based adaptive discontinuous reception method for improving a power reduction performance in an asynchronous wideband code division multiple access method.

In detail, A radio resource control layer in a wireless network control apparatus or a base station performs scheduling and adaptively controlling a discontinuous reception cycle for a terminal of a power reduction mode. According to traffic characteristics, QoS, and a terminal power satate, a discontinuous reception cycle of the terminal is adaptively controlled through an extended paging indicator even though terminal is in the discontinuous reception operation. So will bring improvements in power reduction performance, transmission time delay, and transmission failure possibility with respect to the paging message and packet reception (b) Description of the Related Art Since the digital cellular-based second generation mobile communication system was launched, a third generation mobile communication system as an international mobile telecommunication 2000 (IMT-2000) has been standardized by the International Telecommunication Union (ITU) so as to support a high quality multimedia service without limiting area. Recently, as various specifications for the IMT-2000 system, the Universal Mobile Telecommunications System (UMTS) and the CDMA 2000 system completed by two large standardization organizations have been launched or prepared. The two large standardization organizations are Third Generation Partnership Projects (3GPP) and Third Generation Partnership Projects 2(3GPP2).

The asynchronous wideband code division multiple access (WCDMA) technology has been developed in the 3GPP so as to configure a future high speed packet data transmission network of the next generation mobile communication system. The asynchronous WCDMA system has progressed based on a network structure of a conventional GSM (Global System for Mobile communications) scheme, and it may be relatively easily synchronized between base stations and terminals. It advantageously configures such infrastructures as a base station installation in comparison with the IS-95 (Interim Standard-95) series of the conventional synchronous code division multiple access system (CDMA) based base station, and may tremendous marketability and growth potential of upwards of about 80% of the entire world market through capacity improvement.

Meanwhile, the next generation mobile communication network configured based on such a wideband code division multiple access system may have been expected to provide such various high quality multimedia data services that only the wire network had provided such as visual telephone, streaming, and VoD (Video on Demand) in a wireless and mobile environment. However, considering a user terminal, power consumption is rapidly increased and the lifetime of a terminal battery is decreased. If efficient power management for improving a power saving performance is not performed between the base station and the terminal, and all the terminal power is consumed before the user sufficiently receives various services supplied from the base station.

Accordingly, in order to reduce terminal power consumption, the next generation mobile communication service has focused on a method for increasing the terminal battery lifetime with an efficient power saving method through the minimizing of terminal power consumption by effectively stopping or controlling a terminal power supply during intermittent use or by not using a wireless communication link.

Accordingly, in order to save terminal power, the 3GPP specification for the wideband code division multiple access system may have three terminal power saving modes related to a radio resource control (RRC) layer, an idle mode and Cell_PCH and URA_PCH states of the connected mode, and it provides a paging message indication method through a discontinuous reception (DRX) of the paging indicator channel (PICH).

FIG. 1 is a block diagram for showing a cross-relation among an idle mode, a connected mode, a power saving mode for reducing terminal power, and a power active mode in a wideband code division multiple access system.

The paging indicator (PI) detection-based terminal power saving method is proposed by the present 3GPP specification, it uses the discontinuous reception cycle length in the power saving mode. Paging indicators occur on the corresponding physical channel, the paging indication channel(PICH). For each terminal, a paging indicator channel frame is referred to as a paging occasion (PO) block. The terminal that performs power saving through such discontinuous reception of paging indication has an allocated specified paging indicator position in the specified paging occasion block of the discontinuous reception cycle. It checks its paging indicator, and it then determines whether to return to a discontinuous reception process so as to save power or to convert to power active modes of Cell_FACH and Cell_DCH states, that is, the connected mode of FIG. 1, according to the existence or non-existence of the paging message for packet transmission/reception. Since such a method applies the same length of discontinuous reception cycles for all terminals performing power saving within the specified cells, the base station has a small load for the power saving. In addition, since the pluralities of terminals are evenly distributed, a false alarm probability with respect to the paging message reception of the terminals in cells may be reduced.

Hereinafter, a power saving method using a conventional discontinuous reception method in the wideband code division multiple access scheme will be described with reference to FIG. 2.

FIG. 2 illustrates periodic paging confirmation through a conventional fixed discontinuous reception method so as to save terminal power in a wideband code division multiple access method.

First, all the terminals performing power saving in a specified cell receive the same discontinuous reception cycle coefficient (DRX Cycle Length Coefficient) □ though system information broadcasting of the base station, and determine the discontinuous reception cycle through Equation 1.

$$DRX\ Cycle\ Length = MAX(2^k, PBP)\ [frames] \qquad \text{EQUATION 1}$$

Herein, "PBP" indicates Paging Block Periodicity and is given as 1 in the case of the Frequency Division Duplexing (FDD)-based wideband code division multiple access schemes, and accordingly, a final discontinuous reception cycle become a $2^k$ frames. Referring to the 3GPP specification, "☐" is determined by one of integers 6, 7, 8, and 9, and accordingly the discontinuous reception cycle becomes $2^k$, that is, 64, 128, 256, and 512 frames. The paging occasion positions for the specified terminals in the given discontinuous reception cycle may be determined by Equation 2.

$$PO = [(IMSI \ div \ K) \bmod (DRX \ Cycle \ Length \ div \ PBP)] \times \quad \text{(Equation 2)}$$
$$PBP + n \times DRX \ Cycle \ Length + Frame \ Offset$$
$$= [(IMSI \ div \ K) \bmod 2^k] + n \times 2^k (n = 0, 1, 2, ...)$$

In Equation 2, "Frame Offset" is given as 0 in the case of the FDD-based wideband code division multiple access schemes, and it has no effect on the position determination of the final paging occasion block. In Equation 2, "IMSI" (International Mobile Subscriber Identity) indicates a Non-Access Stratum (NAS) identifier for identifying the terminal, "K" indicates the number of Secondary Common Control Physical Channels (SCCPCH) of the physical channel including the paging channel (PCH), that is, the transport channel and "n" indicates a system frame number (Cell SFN). In addition, in Equation 2, "div" is given as an operator for returning an integer share with respect to a result of a division operation, and "mod" indicates modular arithmetic. The final paging indicator position of the specified terminal in the paging occasion determined in this manner is determined by Equation 3.

$$PI(\text{Paging Indicator}) = (IMSI \ div \ 8192) \bmod N_p \quad \text{EQUATION 3}$$

In Equation 3, "$N_p$" indicates the number of paging indicators for a paging indicator channel frame, and is determined by one of 18, 36, 72, and 144 according to the 3GPP specification. Particularly, "PI" is expressed in a format of a sequential Run for bit "11" or "00" and has a repeated structure by 8, 4, 2, and 1 times according to an $N_p$ value. Also, one PI may share at least one terminal according to the cell status, or may not use any terminal. When the PI is expressed in the repeated format of the bit "11", it provides information that there is a paging message for the specified terminal among the terminals sharing the corresponding PI. Once a PI has been detected, the related terminals decodeds the next PCH frame transmitted on the Secondary CCPCH to see whether there is a paging message intended for them. If specified terminals find paging message intended for them, then finish the discontinuous reception operation and transition into the power active mode, CELL_FACH state. Otherwise, return to the discontinuous reception process of the power saving mode. When the PI has the repeated structure of the bit "00", it provides information that there is no paging message of the base station for any terminals sharing the corresponding PI. In this case, all the terminals that have received the PI return to the discontinuous reception process without additional operations.

FIG. 2 illustrates one example of the discontinuous reception method in the case that ☐ is given as 3, IMSI is given as 77777, K is given as 5, n is given as 10, and $N_p$ is given as 18.

According to the discontinuous reception method for saving power in the 3GPP specification, the terminals obtain system information of the cell from the base station broadcasting message, and accordingly obtain a discontinuous reception cycle coefficient. In addition, according to Equation 1, Equation 2, and Equation 3, all the terminals of the cell determine whether to decode the paging information of Secondary CCPCH on the fixed PO with a constant interval without regarding various traffic characteristics and service requirements.

However, the terminals may face various time-varying traffic contents according to required QoS even in the same cell. And conventional discontinuous reception methods without considering of the power status of the terminals by base station may not improve the power saving performance. Accordingly, such a fixed discontinuous reception (FDRX: FixedDRX) method may not efficiently support power saving of different terminals requiring various QoS.

Along this line, Korean Patent Application No 10-2000-0047204 "Channel communication method and apparatus of code division multiple access communication system" (2000.8.16) disclosed a method for transmission of Paging indicator matched with the discontinuous reception cycle in the code division multiple access communication system. However, it only has an effect on the capacity increase, and it includes a problem in that the power saving effect of the terminal is not provided.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an extended paging indicator-based adaptive discontinuous reception method having advantages of improving a power saving performance in an asynchronous wideband code division multiple access system. This method adaptively increase or decrease a terminal's paging indicator reception period within discontinuous reception cycle through extended paging indicator. The wireless network control equipment or the base station performs scheduling and determine Terminal's paging indicator reception period in power saving mode state An exemplary embodiment of the present invention provides an adaptive discontinuous reception method in a terminal of asynchronous wideband code division multiple access including (a) receiving an extended paging indicator for a discontinuous reception cycle, (b) verifying a type of a bit Run for configuring the extended paging indicator, and (c) changing a discontinuous reception period according to the type of the bit Run.

An exemplary embodiment of the present invention provides an adaptive discontinuous reception method of a terminal in an asynchronous wideband code division multiple access scheme, including (a) setting a discontinuous reception period update factor m that varies according to an extended paging indicator so as to determine a next paging occasion block, (b) setting an initial value of the discontinuous reception period update factor in a terminal beginning with receiving adaptive discontinuous reception, (c) varying the discontinuous reception period update factor value according to a paging indicator of the bit Run that is received from the base station, and (d) varying the discontinuous reception period according to the variance of the discontinuous reception period update factor value.

DETAILED DESCRIPTION OF THE EMBODIMENTS

Figure 1:
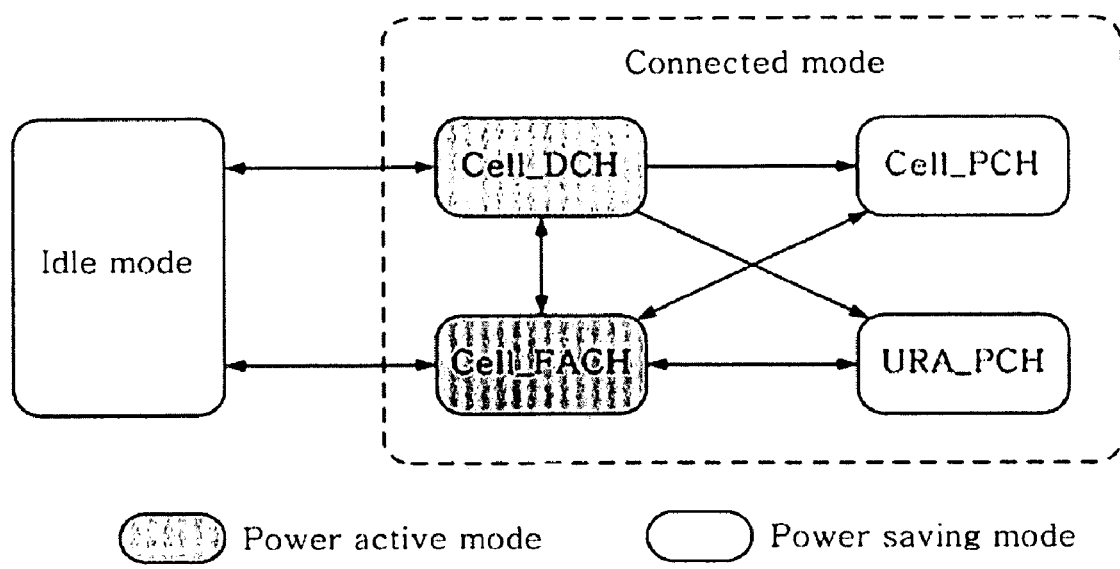
FIG. 1 is a block diagram for showing a cross-relationship among an idle mode, a connected mode, a power saving mode for reducing terminal power, and a power activation mode in a wideband code division multiple access method.
Figure 2:
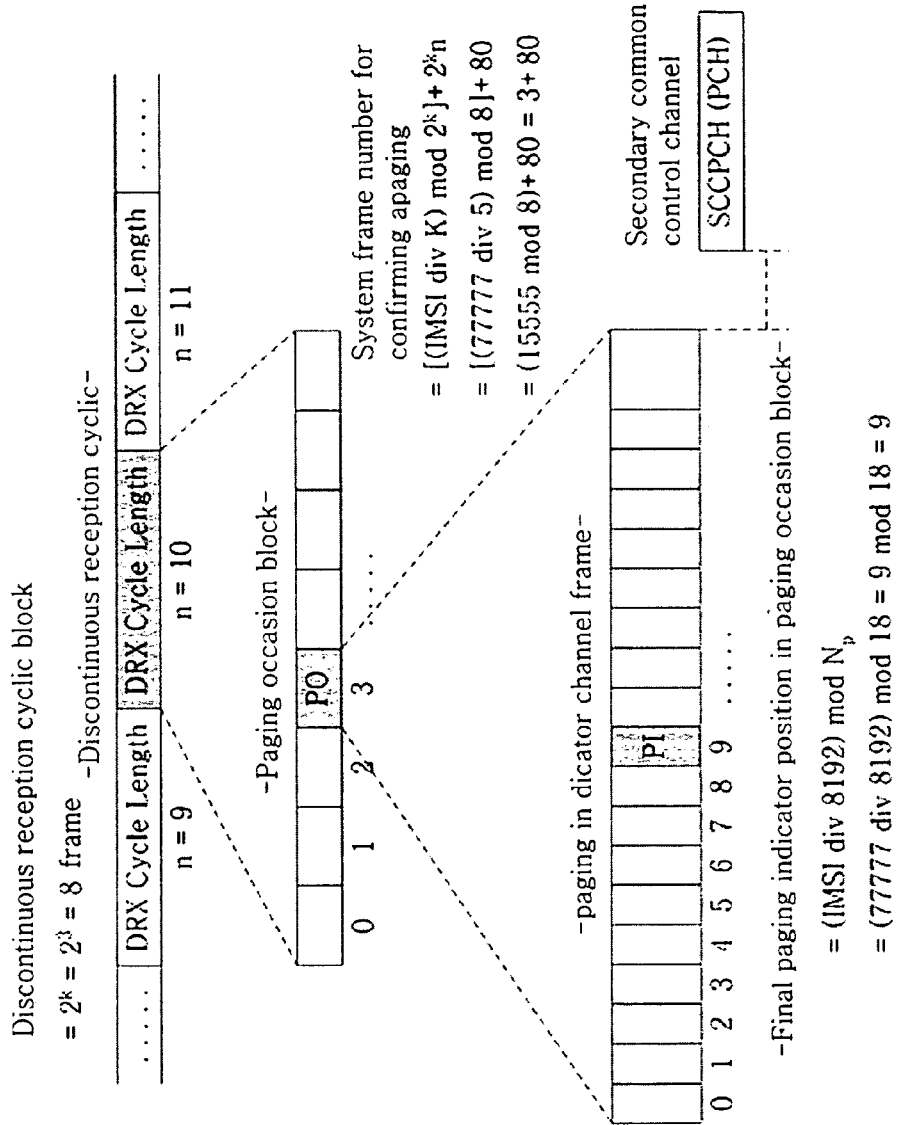
FIG. 2 illustrates periodic paging confirmation through a conventional fixed discontinuous reception method so as to save terminal power in a wideband code division multiple access method.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is coupled to another element, the element may be directly coupled to the other element or coupled to the other element through a third element.

In addition, a module described in the specification indicates a block formed for variation and plug-in of a hardware or software system. That is, the module indicates a unit or a block for performing a predetermined function in the hardware and software.

Before describing an extended paging indicator-based adaptive discontinuous reception method for improving terminal power saving performance in an asynchronous wideband code division multiple access according to an exemplary embodiment of the present invention, in order to adaptively control a terminal discontinuous reception period, additional signaling between the base station and the terminal is required. By way of a discontinuous reception cycle for saving terminal power, conversion into a Cell_FACH state as a power active mode is inevitably required, and accordingly, a terminal power consumption increase may occur. However, an extended paging indicator for an adaptive discontinuous reception method according to an exemplary embodiment of the present invention additionally uses a continuous Run of bits "01" and "10" not used in the conventional paging indicator such that it is possible to control a terminal discontinuous reception period without the conversion into the power active mode by way of a discontinuous reception cycle for saving terminal power.

Although the extended paging indicator is used for the adaptive discontinuous reception method, it has no effect on the terminal performing power saving through the convention fixed discontinuous reception method.

Figure 3:
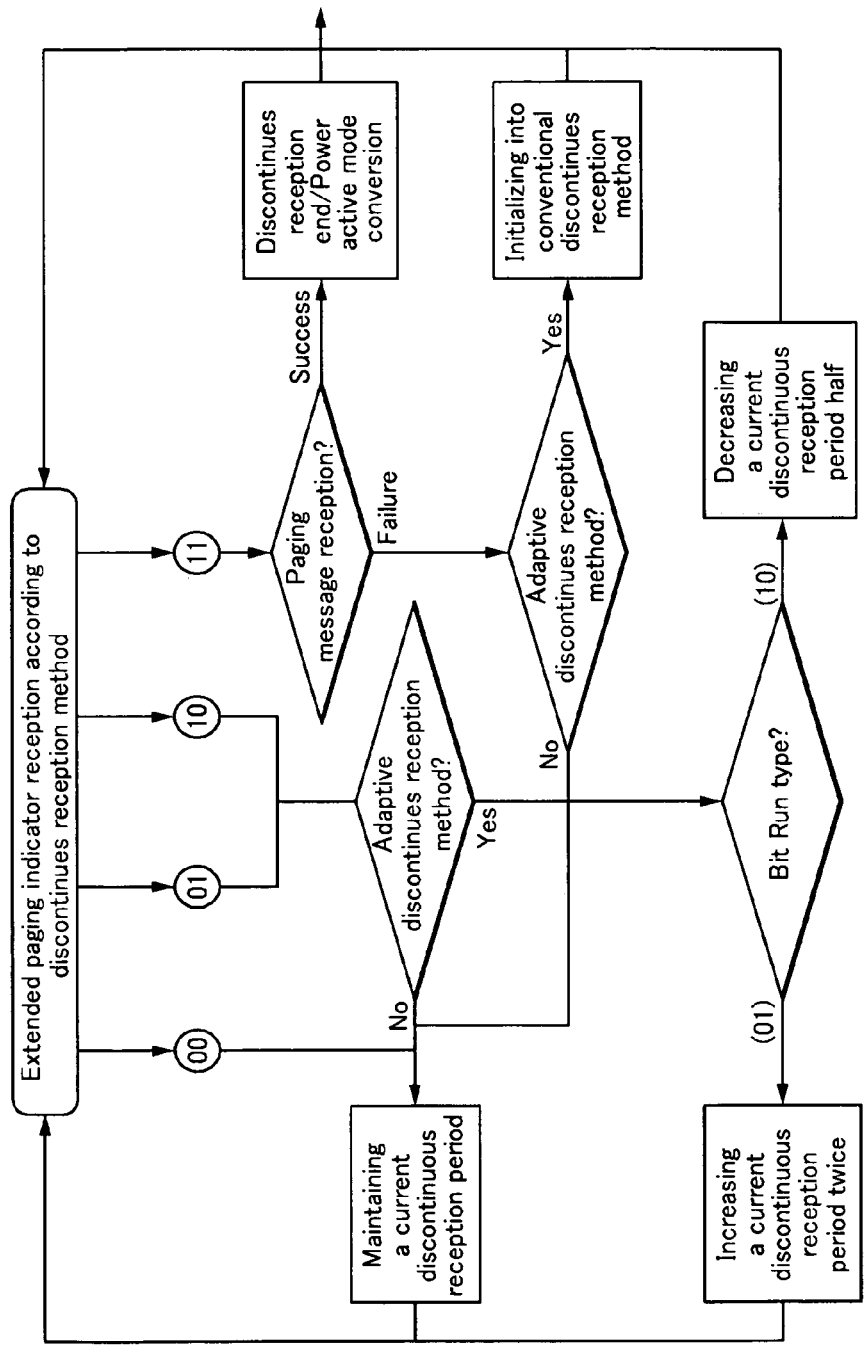
FIG. 3 is a flowchart for interworking of an extended paging indicator-based adaptive discontinuous reception method according to an exemplary embodiment of the present invention.

FIG. 3 is a flowchart for interworking of an extended paging indicator-based adaptive discontinuous reception method according to an exemplary embodiment of the present invention.

First, all the terminals performing power saving in the same cell receive an extended paging indicator of inherent slot position in a paging indicator channel frame corresponding to the respective inherent discontinuous reception cycle.

In order to conform a type of bit Run forming the received paging indicator and save power, the terminal determines the type of corresponding discontinuous reception method requested from the base station, that is, the conventional fixed discontinuous reception method or an adaptive discontinuous reception method according to an exemplary embodiment of the present invention, and updates or maintains a paging conform position, that is, a discontinuous reception period.

The extended paging indicator used in the adaptive discontinuous reception method according to an exemplary embodiment of the present invention is defined as in Table 1.

TABLE 1

| Type of bit Run | Extended paging indicator function for adaptive discontinuous reception |
|---|---|
| 00 | Maintain a current discontinuous reception period |
| 01 | Increase a current discontinuous reception period twice |
| 10 | Decrease a current discontinuous reception period half |
| 11 | Return to a conventional fixed discontinuous reception period without the current discontinuous reception period |

Herein, when a type of bit Run forming the extended paging indicator is given as "00" or "11", the inherent paging indicator function for informing of the existence of the corresponding terminal paging message used in the conventional fixed discontinuous reception method as well as functions of Table 1 for the adaptive discontinuous reception method according to an exemplary embodiment of the present invention may be continuously performed. Meanwhile, in the case of an extended paging indicator having the type of bit Run "01" in Table 1, it has a function for increasing the current discontinuous reception period twice, and accordingly the discontinuous reception period, that is, the paging conformation period, may occasionally be greater than the discontinuous reception cycle. In addition, in the case of an extended paging indicator having the type of bit Run "10", the inverse of the above-noted "01", the current discontinuous reception period is decreased by half, and accordingly the terminal paging conformation period may occasionally be smaller than the discontinuous reception cycle.

Before giving a detailed description of the extended paging indicator-based adaptive discontinuous reception method according to an exemplary embodiment of the present invention, a discontinuous reception period update factor (Update Factor) m for determining a next paging occasion block is defined. When the terminals start an adaptive discontinuous reception method according to the base station's instruction to save terminal power, the terminal establishes an initial value of m as 1, and then receives an initial extended paging indicator after the conventional discontinuous reception method, that is, the correct time of the discontinuous reception cycle. Such m value is varied according to the type of bit Run forming the extended paging indicator, and thus it determines a next confirmation position of the terminal performing an adaptive discontinuous reception method so as to save power. Herein, a minimum and maximum value of a range of m, that is, the discontinuous reception period, may be previously determined by the base station considering the overall cell context and traffic characteristics or the like.

A temporary identifier IMSI_ADRX for the only terminals performing an adaptive discontinuous reception method according to an exemplary embodiment of the present invention is provided to the specified terminal by a scheduling result of the base station. Particularly, the base station limits the number of terminals performing an adaptive discontinuous reception method within a predetermined level in the one cell in order to reduce a collision probability of the extended paging indicator position, provides the same IMSI_ADRX to a group of terminals having a similar characteristic, and manages the terminals in the group unit. Accordingly, the range of such IMSI_ADRX values is limited as in Equation 4 by the minimum value $m_{min}$ previously determined by the base station.

$$0 \leq IMSI\_ADRX \leq [(2k \times m_{min})-1] \quad \text{EQUATION 4}$$

In addition, the paging occasion block position of the specified terminal performing an adaptive discontinuous reception method is determined as Equation 5 by means of Equation 4 and the discontinuous reception period update factor m.

$$\text{next } PO = \text{current } PO + (m \times 2k) \quad \text{EQUATION 5}$$

In Equation 5, "next PO" indicates a paging occasion block of a next time point and "current PO" indicates a paging occasion block of a current time point. The terminal-corresponding next paging occasion block is determined by updating the discontinuous reception period according to such m, and then the terminal determines a final slot position in the paging indicator channel frame for receiving the extended paging indicator using a disconnected layer identifier IMSI based on Equation 3 in the same manner as in the conventional fixed discontinuous reception method.

Meanwhile, the extended paging indicator functions defined in Table 1 may be rearranged as in Equation 6 by applying the discontinuous reception period update factor m.

$$EPI \begin{cases} \text{Bit Run} = '00' \to m = m & \text{(Preserve DRX Period)} \\ \text{Bit Run} = '01' \to m = 2m & \text{(Increase DRX Period)} \\ \text{Bit Run} = '10' \to m = m/2 & \text{(Decrease DRX Period)} \\ \text{Bit Run} = '11' \to m = 1 & \text{(Reset DRX Period)} \end{cases} \quad \text{(Equation 6)}$$

FIG. 4A to FIG. 4E illustrate paging indicator reception through an extended paging indicator-based adaptive discontinuous reception method according to an exemplary embodiment of the present invention.

Figure 4A:
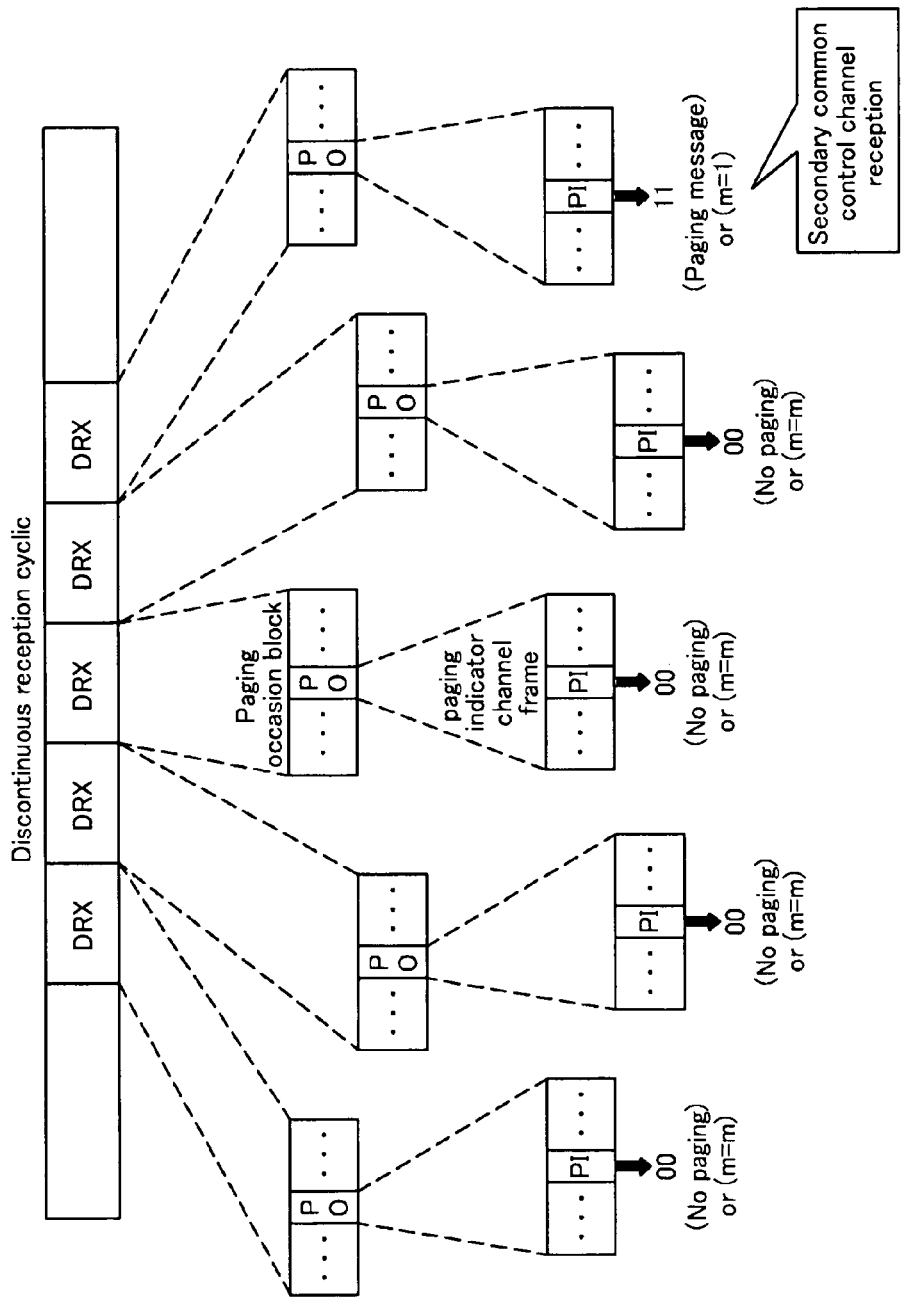
FIG. 4A to FIG. 4E illustrate paging indicator reception through an extended paging indicator-based adaptive discontinuous reception method according to an exemplary embodiment of the present invention.

In FIG. 4A, although the initial value of m is given as 1 and the corresponding terminal performs an adaptive discontinuous reception method, it uses an extended paging indicator of the bit Run "00" to continuously fix a discontinuous reception period, and accordingly it may continuously maintain the same paging conformation period as the conventional fixed discontinuous reception method.

Figure 4B:
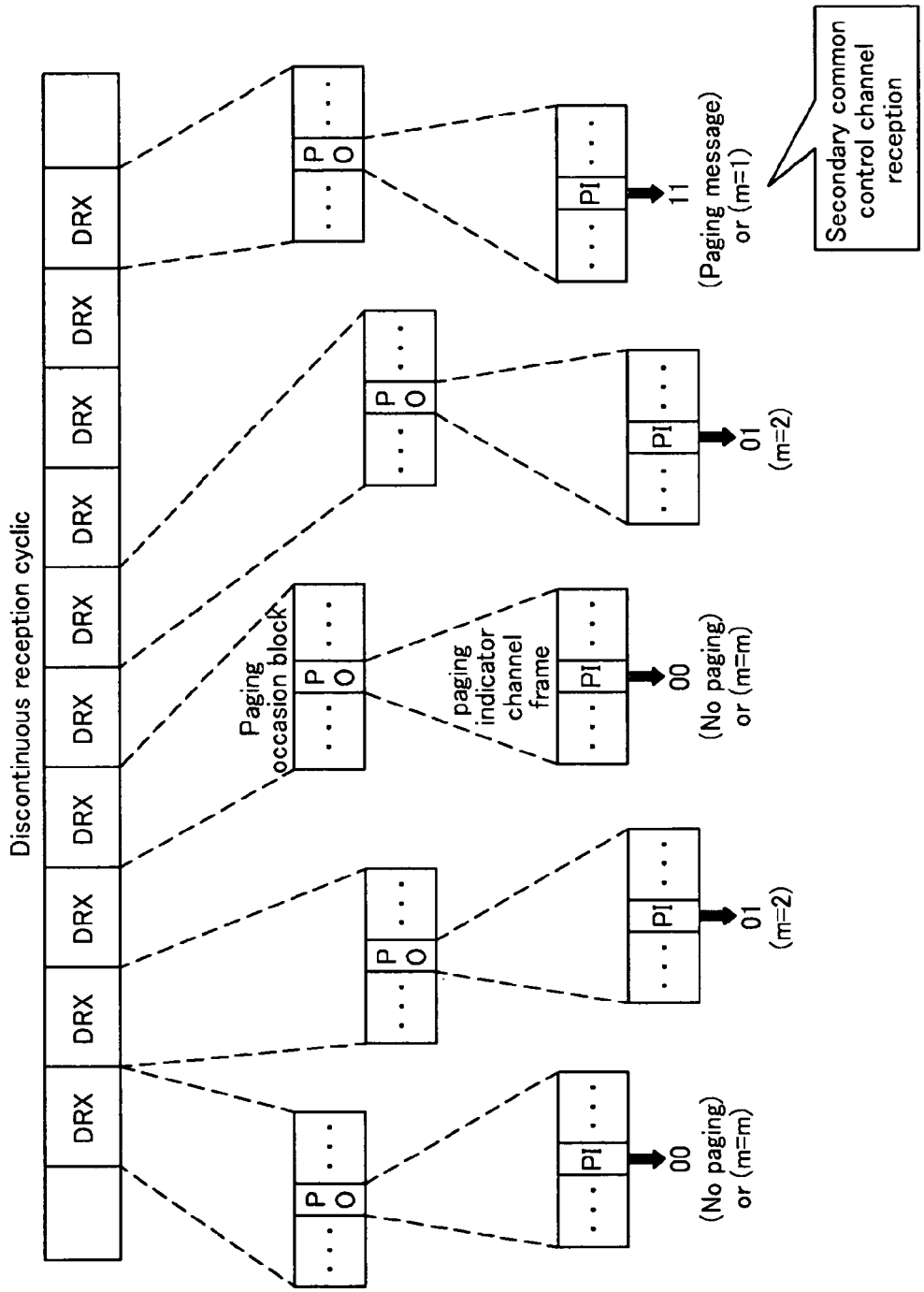

In FIG. 4B, the initial value of m is given as 1, and in this case it uses an extended paging indicator of the bit Run "01", and accordingly it may increase the paging confirmation period to be larger than that of the conventional discontinuous reception cycle.

Figure 4C:
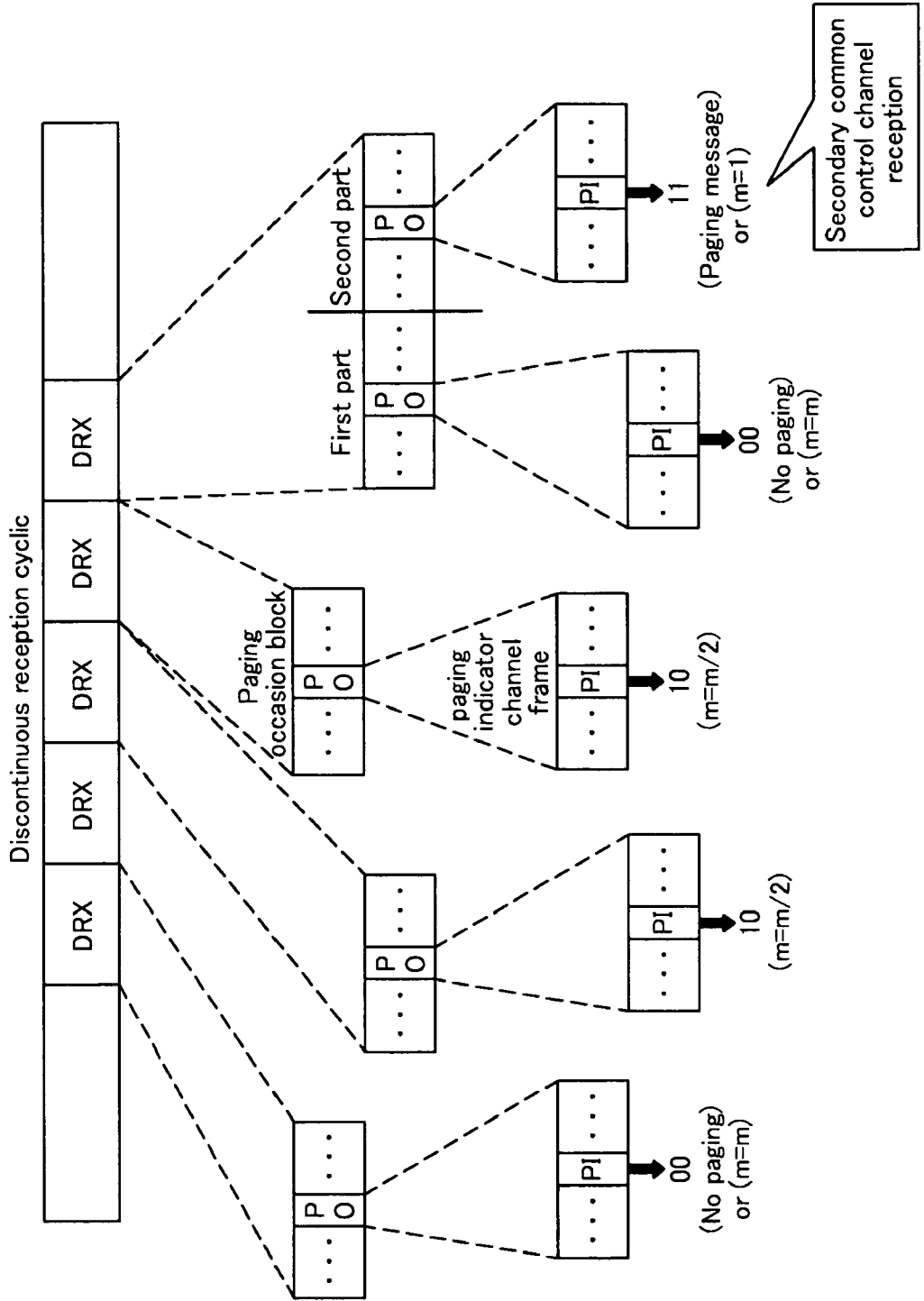

In FIG. 4C, the initial value of m is given as 2, and in this case, inverse to FIG. 4B, it uses an extended paging indicator of the bit Run "10", and accordingly it may decrease the paging confirmation period to be smaller than that of the discontinuous reception cycle.

Figure 4D:
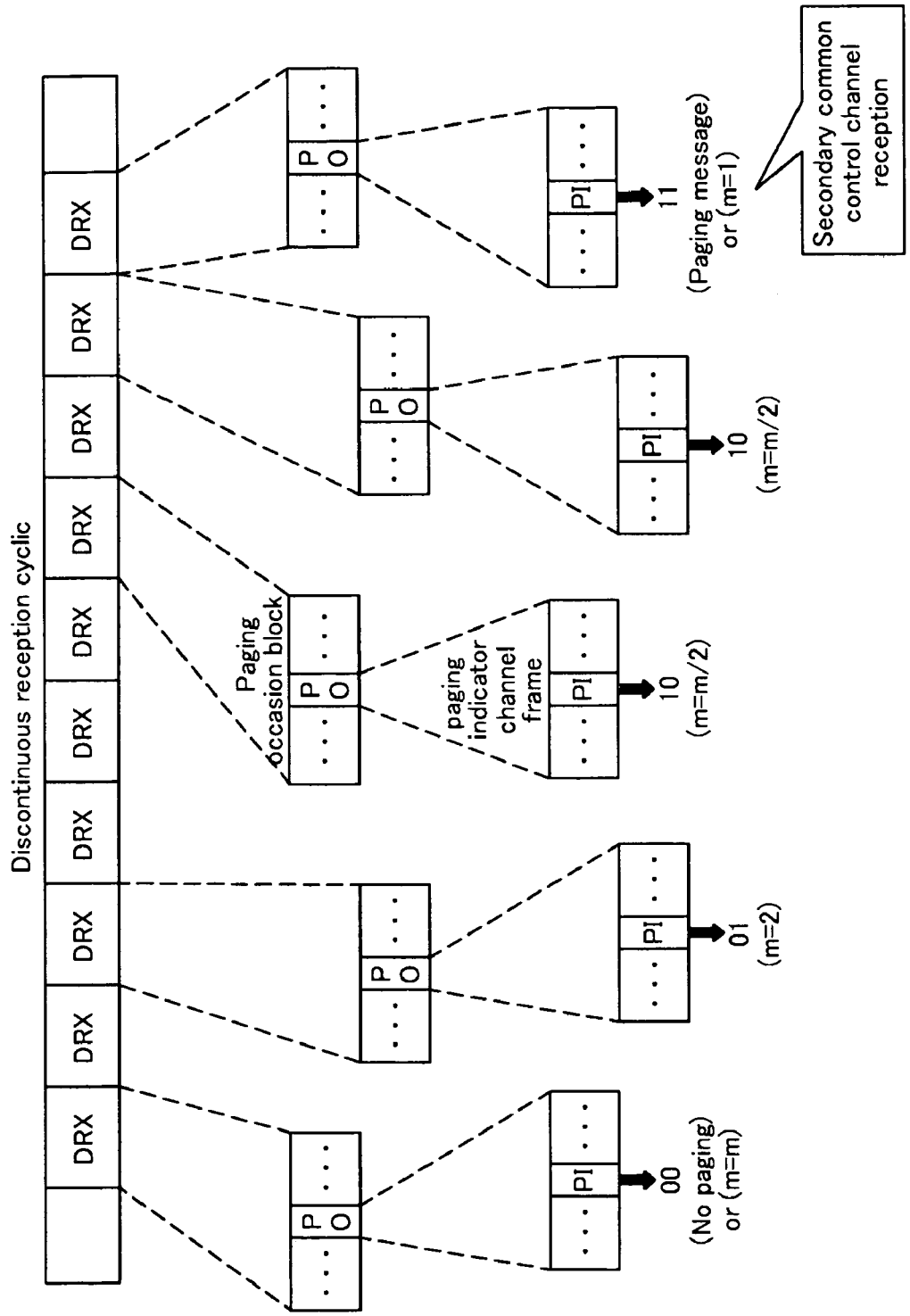

In FIG. 4D, the initial value of m is given as 2, and in this case the corresponding terminal uses an extended paging indicator of the bit Run "01" or "10", and accordingly it may adaptively increase or decrease the paging confirmation period.

Figure 4E:
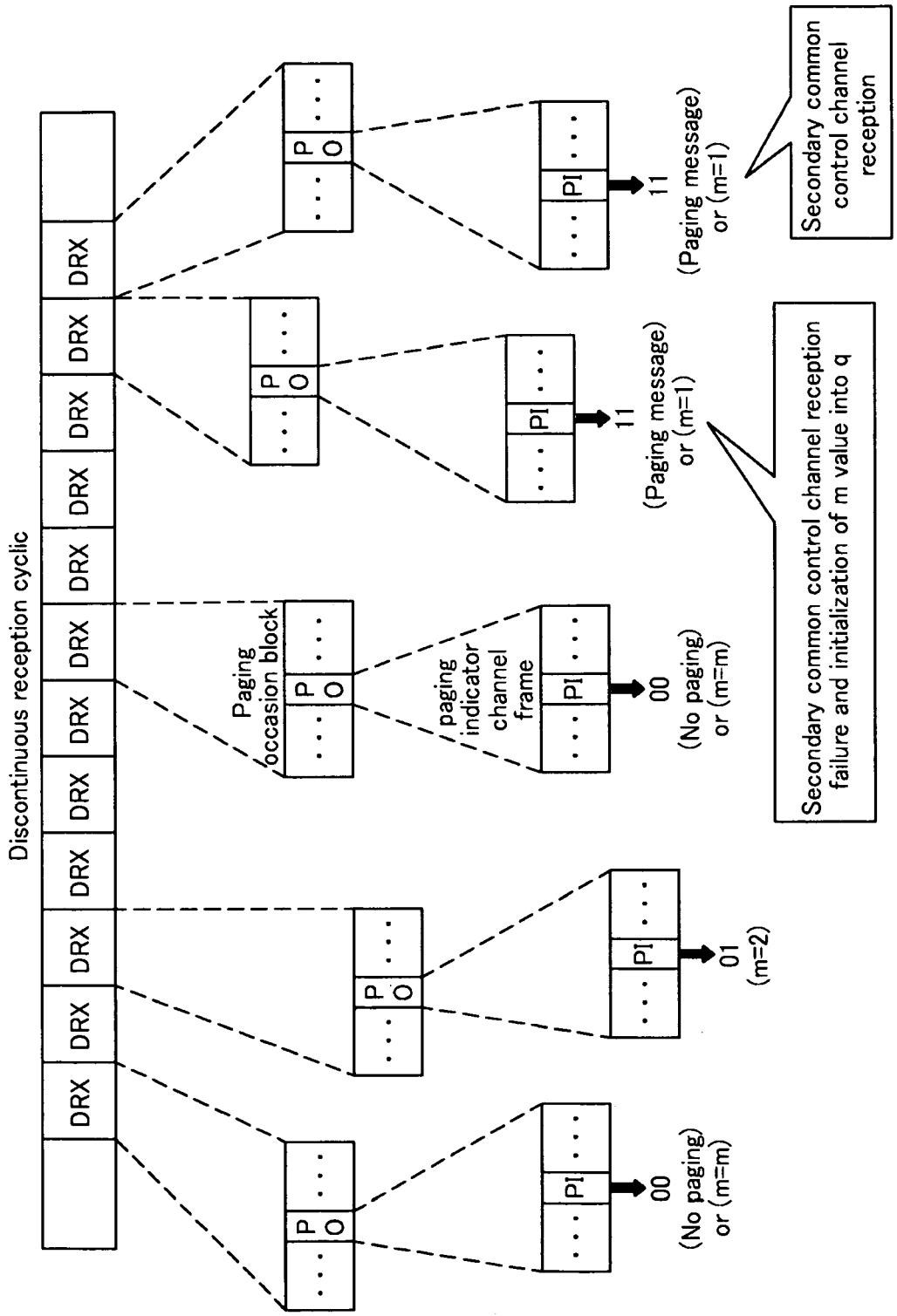

In FIG. 4E, the initial value of m is given as 2, and in this case the corresponding terminal uses an extended paging indicator of the bit Run "11", and accordingly it may initialize the much-increased paging confirmation period into the same paging confirmation period as the conventional fixed discontinuous reception cycle.

As described above, the changing of the discontinuous reception period according to the bit Run may variously occur according to mobile communication system operation enterprises or terminal manufacturing enterprises.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to an extended paging indicator-based adaptive discontinuous reception method for improving a power saving performance in an asynchronous wideband code division multiple access scheme, in order to compensate the conventional fixed discontinuous reception method, the wireless network control equipment or the base station may perform scheduling to the corresponding terminals of the power saving mode state, and may adaptively increase or decrease a paging indicator reception period, that is, a terminal discontinuous reception period in a paging occasion block by the extended paging indicator according to a traffic characteristic, QoS, and a terminal power state by way of the discontinuous reception cycle. With the adaptive discontinuous reception method using the extended paging indicator according to an exemplary embodiment of the present invention, in comparison with the conventional fixed discontinuous reception method, the transmission time delay with respect to paging message and packet reception, and transmission failure probability as well as power saving performance, may be enhanced.

What is claimed is:

1. An adaptive discontinuous reception method of a terminal using asynchronous wideband code division multiple access, comprising:
    receiving an extended paging indicator for a discontinuous reception cycle;
    verifying a type of bit Run for configuring the extended paging indicator;
    maintaining the discontinuous reception period, when the bit Run corresponds to the first type;
    returning the discontinuous reception period to a previously set fixed discontinuous reception period, when the bit Run corresponds to a second type;
    increasing the discontinuous reception period, when the bit Run corresponds to a third type; and
    reducing the discontinuous reception period, when the bit Run corresponds to a fourth type.

2. The adaptive discontinuous reception method of claim 1, further comprising, between the verifying -and the changing, verifying whether a base station-introducing discontinuous reception method is a fixed discontinuous reception method or an adaptive discontinuous reception method through the verifying of the type of the bit Run.

3. The adaptive discontinuous reception method of claim 1 wherein in the case that the bit Run corresponds to the first type or the second type, the bit Run performs a paging indicator function for informing the terminal of existence or nonexistence of a paging message.

4. The adaptive discontinuous reception method of claim 1, wherein at the receiving, the terminal receives the extended paging indicator by receiving system information of a cell from the base station charging the cell in which the terminal is disposed through system information broadcasting.

5. The adaptive discontinuous reception method of claim 1, further comprising, before the receiving,
   setting an adaptive power saving mode, and
   performing scheduling with a wireless network control apparatus or base station.

6. The adaptive discontinuous reception method of claim 5, further comprising, between the performing and the receiving, determining a paging occasion block corresponding to the terminal in the discontinuous reception cycle using temporary identifier IMSI_ADRX for the allocated adaptive discontinuous reception method as the result of the scheduling; and obtaining a slot position in a paging indicator channel frame using a Non-Access Stratum (NAS) layer identifier Internal Mobile Subscriber Identity (IMSI) so as to receive the extended paging indicator transmitted from the base station.

7. The adaptive discontinuous reception method of claim 6, wherein the temporary identifier is presented to the terminal that performs the adaptive discontinuous reception method according to the scheduling result.

8. The adaptive discontinuous reception method of claim 6, wherein the number of terminals obtaining the temporary identifier IMSI_ADRX is limited as $0 \leq \text{IMSI\_ADRX} \leq [(2^k \times m_{min})-1]$ (herein, $m_{min}$ is given as a minimum value of the discontinuous reception period update factor m that the base station previously sets, and k is given as a discontinuous reception cycle coefficient).

9. The adaptive discontinuous reception method of claim 7, wherein a plurality of terminals having an analogous characteristic are grouped and managed by presenting the same temporary identifier thereto.

10. An adaptive discontinuous reception method of a terminal of an asynchronous wideband code division multiple access scheme, the adaptive discontinuous reception method comprising:
    setting a discontinuous reception period update factor m that varies according to an extended paging indicator so as to determine a next paging occasion block;
    setting an initial value of the discontinuous reception period update factor in a terminal beginning with receiving an adaptive discontinuous reception;
    verifying a type of bit Run received from the base station;
    maintaining the discontinuous reception period update factor value when the bit Run corresponds to a first type for maintaining the discontinuous reception period;
    setting the discontinuous reception period update factor as the initial value when the bit Run corresponds to a second type for returning the discontinuous reception period update factor value into a previously set fixed discontinuous reception period;
    increasing the discontinuous reception period update factor value when the bit Run corresponds to a third type for increasing the discontinuous reception period;
    decreasing the discontinuous reception period update factor value when the bit Run corresponds to a fourth type for decreasing the discontinuous reception period; and
    varying the discontinuous reception period according to the variance of the discontinuous reception period update factor value.

11. The adaptive discontinuous reception method of claim 10, wherein the step varying the discontinuous reception period includes:
    determining the next paging verification position according to the variance of the discontinuous reception period update factor value; and
    changing the discontinuous reception period considering a range of the previously set discontinuous reception period update factor values and whole cell context and traffic characteristics.

* * * * *